(12) United States Patent
Lee et al.

(10) Patent No.: US 10,553,345 B2
(45) Date of Patent: Feb. 4, 2020

(54) COIL DEVICE AND APPARATUS INCLUDING THE SAME

(71) Applicant: WITS Co., Ltd., Yongin-si, Gyeonggi-do (KR)

(72) Inventors: Chang Hee Lee, Suwon-si (KR); Hyo Jung Yoon, Suwon-si (KR); Jae Sun Won, Suwon-si (KR); Hee Seung Kim, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 91 days.

(21) Appl. No.: 15/459,366

(22) Filed: Mar. 15, 2017

(65) Prior Publication Data

US 2017/0278619 A1    Sep. 28, 2017

(30) Foreign Application Priority Data

Mar. 25, 2016  (KR) .................. 10-2016-0036095
Jul. 14, 2016   (KR) .................. 10-2016-0089248

(51) Int. Cl.
| | | |
|---|---|---|
| *H01F 5/00* | (2006.01) | |
| *H01F 27/28* | (2006.01) | |
| *H02J 50/10* | (2016.01) | |
| *H02J 7/02* | (2016.01) | |

(52) U.S. Cl.
CPC ........... *H01F 27/2804* (2013.01); *H01F 5/00* (2013.01); *H02J 7/025* (2013.01); *H02J 50/10* (2016.02)

(58) Field of Classification Search
CPC ............................ H01F 5/00; H01F 27/00–36
USPC ........................................... 336/65, 200, 232
See application file for complete search history.

(56) References Cited

U.S. PATENT DOCUMENTS

| | | |
|---|---|---|
| 2011/0102125 A1 | 5/2011 | Tamura et al. |
| 2013/0214890 A1 | 8/2013 | Zabaco |
| 2013/0257362 A1 | 10/2013 | Lim et al. |
| 2015/0222017 A1 | 8/2015 | Kumura et al. |

FOREIGN PATENT DOCUMENTS

| | | |
|---|---|---|
| CN | 103366931 A | 10/2013 |
| CN | 104184217 A | 12/2014 |
| CN | 104246925 A | 12/2014 |
| CN | 104821437 A | 8/2015 |

(Continued)

OTHER PUBLICATIONS

Chinese Office Action dated Aug. 3, 2018 in corresponding Chinese Patent Application No. 201410183184.3 (8 pages in English, 7 pages in Chinese).

(Continued)

*Primary Examiner* — Tuyen T Nguyen
(74) *Attorney, Agent, or Firm* — Harness, Dickey & Pierce, P.L.C.

(57) ABSTRACT

A coil device includes a board, a first pattern formed on one surface of the board, and a second pattern formed on the other surface of the board. At least one pattern via electrically connects the first pattern and the second pattern to each other. A via region, corresponding to a region in which the pattern via is formed in the first pattern, includes n first conducting wires (where n is a natural number of 1 or more). At least a portion of the first pattern, excluding the via region in the first pattern, includes m first conducting wires (where m is greater than n and is a natural number of 2 or more).

20 Claims, 13 Drawing Sheets

(56) References Cited

FOREIGN PATENT DOCUMENTS

| | | |
|---|---:|---:|
| EP | 2 645 385 A2 | 2/2013 |
| JP | 2006-157985 A | 6/2006 |
| JP | 2010-016235 A | 1/2010 |
| JP | 2012016234 A * | 1/2012 |
| JP | 2013-078234 A | 4/2013 |
| KR | 10-2013-0110397 A | 10/2013 |

OTHER PUBLICATIONS

Chinese Office Action dated Apr. 3, 2019 in corresponding Chinese Patent Application No. 201710183184.3 (7 pages in English, 6 pages in Chinese).

* cited by examiner

A

COIL DEVICE AND APPARATUS INCLUDING THE SAME

CROSS-REFERENCE TO RELATED APPLICATIONS

This application claims benefit under 35 USC 119(a) of Korean Patent Application Nos. 10-2016-0036095 filed on Mar. 25, 2016 and 10-2016-0089248 filed on Jul. 14, 2016 in the Korean Intellectual Property Office, the entire disclosure of which is incorporated herein by reference for all purposes.

BACKGROUND

1. Field

The present disclosure relates to a coil device and an apparatus including the same.

2. Description of Related Art

An apparatus may include a coil device for communicating with other apparatuses or wirelessly receiving power from an external source. When current flows to a coil of a coil device, the resistance value is increased due to an eddy current, a skin effect, or the like. The increased resistance value increases loss of a communication's signal or wireless power when transmitting or receiving the communications signal or the wireless power, thereby reducing efficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil device includes a first pattern formed on one surface of a board and a second pattern formed on the other surface of the board. At least one pattern via electrically connects the first pattern and the second pattern to each other. A via region, corresponding to a region in which the pattern via is formed in the first pattern, includes n first conducting wires (where n is a natural number of 1 or more). At least a portion of the first pattern, excluding the via region in the first pattern, includes m first conducting wires (where m is greater than n and is a natural number of 2 or more).

The coil device may further include a plurality of pads and a first connection pattern electrically connecting a distal end of an inner side of the first pattern and one of the plurality of pads to each other. The at least one pattern via may comprise pattern vias. In a region in which the first connection pattern is formed, spiral paths of the first pattern are discontinued to terminate in pattern vias.

A distal end of an inner side of the second pattern may be electrically connected to the distal end of the inner side of the first pattern through one of the pattern vias. A distal end of an outer side of the second pattern may be electrically connected to a distal end of an outer side of the first pattern through another one of the pattern vias formed in positions adjacent to the first connection pattern.

The plurality of pads may include first and second pads formed on one surface of the board; a third pad formed on the other surface of the board and electrically connected to the first pad; a fourth pad formed on the other surface of the board and electrically connected to the second pad, and one end of the first connection pattern being connected to the distal end of the inner side of the first pattern, and the other end of the first connection pattern is electrically connected to the third pad through a via.

The coil device may further include a second connection pattern formed on one surface of the board and may have one end connected to the distal end of the outer side of the first pattern and the other end electrically connected to the fourth pad through a via.

The coil device may further include a second connection pattern formed on the other surface of the board in order to electrically connect the distal end of the outer side of the second pattern and the fourth pad to each other.

One end of the second connection pattern may be connected to the fourth pad, and a first connection part connected to a cover formed of a metal is formed at the other end of the second connection pattern. A second connection part connected to the cover may be formed at the distal end of the outer side of the second pattern.

At least one pattern via may be formed in a region adjacent to a distal end of an inner side of the first pattern, and the distal end of the inner side of the first pattern and a distal end of an inner side of the second pattern are electrically connected to each other through the pattern via.

The coil device of may further include first and second pads formed on one surface of the board; a third pad formed on the other surface of the board and electrically connected to the first pad; a fourth pad formed on the other surface of the board and electrically connected to the second pad; a first connection pattern formed on one surface of the board and having one end connected to a distal end of an outer side of the first pattern and the other end electrically connected to the third pad through a via; and a second connection pattern formed on the other surface of the board and having one end connected to a distal end of an outer side of the second pattern and the other end connected to the fourth pad.

In another general aspect, an apparatus includes a cover and a coil device. The coil device includes a board, a first pattern formed on one surface of the board, a second pattern formed on another surface of the board, and at least one pattern via electrically connecting the first pattern and the second pattern to each other. A via region, corresponding to a region in which the pattern via is formed in the first pattern includes n first conducting wires (n indicates a natural number of 1 or more). At least a portion of a coil region, excluding the via region in the first pattern, includes m first conducting wires (where m is greater than n and is a natural number of 2 or more).

The coil device may further comprise first and second pads formed on one surface of the board; a third pad formed on the other surface of the board and electrically connected to the first pad; a fourth pad formed on the other surface of the board and electrically connected to the second pad; and a first connection pattern formed on one surface of the board and having one end connected to a distal end of an inner side of the first pattern and the other end electrically connected to the third pad through a via. The at least one pattern via includes pattern vias. In a region in which the first connection pattern is formed, spiral paths of the first pattern are discontinued to terminate in pattern vias formed in positions adjacent to the first connection pattern.

The coil device may further include a second connection pattern formed on one surface of the board and having one end connected to a distal end of an outer side of the first pattern and the other end electrically connected to the fourth pad through a via.

The cover may include a central region disposed in a conductive plate; a slit part connected to the central region;

and an inductance part formed by the slit part so as to partially enclose the central region.

The coil device may further include a second connection pattern formed on the other surface of the board and connected to the cover so as to have one end connected to the fourth pad and the other end electrically connected to one end of the inductance part, and a distal end of an outer side of the second pattern is electrically connected to the other end of the inductance part.

The coil device may further include first and second pads formed on one surface of the board; a third pad formed on the other surface of the board and electrically connected to the first pad; a fourth pad formed on the other surface of the board and electrically connected to the second pad; a first connection pattern formed on one surface of the board and having one end connected to a distal end of an outer side of the first pattern and the other end electrically connected to the third pad through a via; and a second connection pattern formed on the other surface of the board and having one end connected to a distal end of an outer side of the second pattern and the other end connected to the fourth pad. At least one pattern via may be formed in a region adjacent to a distal end of an inner side of the first pattern. The distal end of the inner side of the first pattern and a distal end of an inner side of the second pattern may be electrically connected to each other through the pattern via.

In another general aspect, a coil device includes a first pattern including first coil strands formed on one surface of a board. Each of the first coil strands has first via regions and at least a first cutout region. The first cutout region includes cutout portions. Each of the first cutout portions extends along the length of a first coil strand in an intermediate portion thereof to divide the intermediate portion of the first coil strand into plural first strands. A second pattern includes a second coil strand formed on another surface of the board. Vias in each of the first via regions electrical connect the first coil strands to the second coil strand.

Each of the first coil strands may include more than one cutout region.

The second coil strand may have second via regions and second cutout portions, each of the second cutout portions extending along the length of the second coil strand in an intermediate portion thereof to divide the intermediate portion of the second coil strand into plural second strands.

Adjacent plural first strands may be connected to each other in parallel.

Adjacent plural second strands may be connected to each other in parallel.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
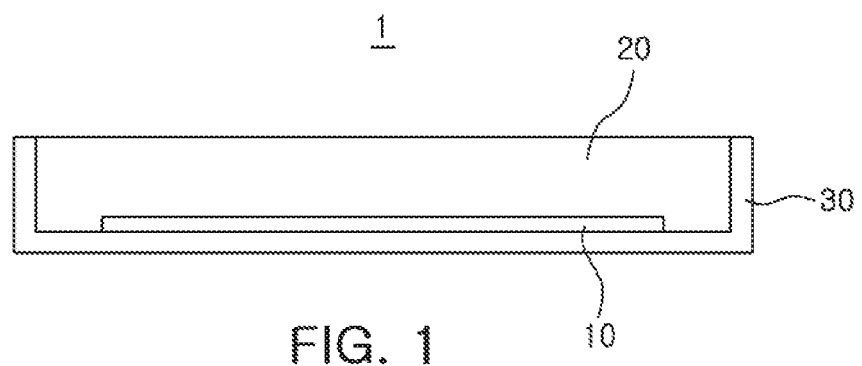
FIG. 1 is a view schematically illustrating an apparatus including a coil device according to an example in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below"

or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a view schematically illustrating an example of an apparatus including a coil device. An apparatus 1 according to an example includes a coil device 10, a body 20, and a cover 30.

The coil device 10 may be a printed circuit board on which a coil is formed. In this case, the coil may be formed on one surface of the printed circuit board or be formed on both surfaces of the printed circuit board. Alternatively, the printed circuit board may be a multilayer printed circuit board, and the coil may also be a multilayer coil.

The body 20 transmits or receives a signal through the coil device 10. For example, the coil device 10 may be a wireless power receiving apparatus receiving wirelessly transmitted power. In this case, the body 20 stores the power received through the coil device 10 therein, and performs a unique function using the stored power. To this end, the body 20 may include a rechargeable battery. As illustrated in FIG. 1, the apparatus 1 may be a mobile communications apparatus such as a smart phone.

The cover 30 may protect the coil device 10 and the body 20. The cover 30 may be formed of a metal. In this case, a portion of the coil formed in the coil device 10 is formed using a portion of the cover 30. That is, a portion of the coil of the coil device 10 also serves as the cover 30.

In the coil device to be described below, transmission and reception efficiency of signals are better in a case in which the cover 30 is formed of metal. However, the cover 30 is not limited to being formed of metal and may also be formed of a non-metal.

Figure 2:
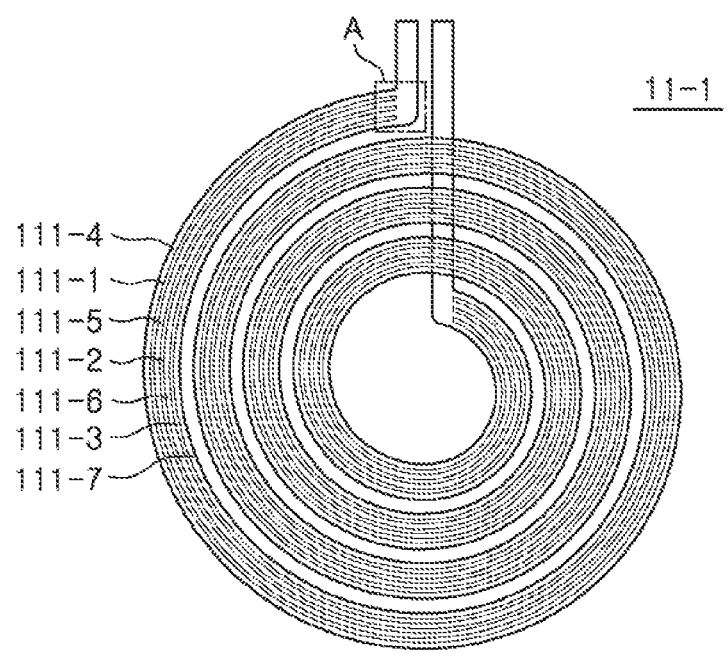
FIG. 2 is a view schematically illustrating a coil of a coil device according to an example in the present disclosure.

FIG. 2 is a view schematically illustrating an example of a coil included in the coil device.

As illustrated in FIG. 2, slits 111-1, 111-2, and 111-3 are formed in coil pattern of a coil 11-1. That is, the coil 11-1 of the coil device includes a plurality of conductive patterns 111-4, 111-5, 111-6, and 111-7 are connected to one another in parallel and each of the adjacent conductive patterns 111-4, 111-5, 111-6, and 111-7 have a slit formed therebetween. Each slit defines a cutout portion extending along the length of a coil pattern or strand, in an intermediate portion thereof, to divide the intermediate portion into multiple strands.

As widths of the coil pattern become wider, attendant eddy current and/or skin effect may become larger, thereby exacerbating the attendant losses. According to an example, the coil of the coil device has the form in which the plurality of conductive patterns are connected to one another in parallel, which reduces eddy current and/or the skin effect. As a result, the loss in the coil device is reduced.

As illustrated in FIG. 2, the slits are formed over an entire region of the coil pattern of the coil 11-1. That is, the coil 11-1 has a form in which the plurality of conductive patterns are connected to one another in parallel over the entire region thereof.

Figure 3:
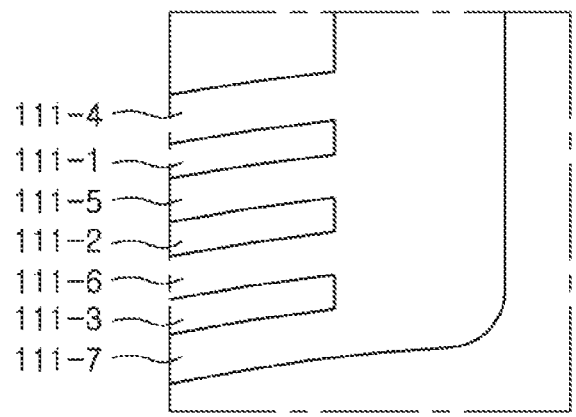
FIG. 3 is a view illustrating a cut-away portion A of FIG. 2 in more detail.

FIG. 3 is a view illustrating a cut-away portion A of the coil 11-1 illustrated in FIG. 2 in more detail. As illustrated in FIG. 3, the slits 111-1, 111-2, and 111-3 are formed in the coil pattern of the coil 11-1 of the coil device, such that the coil 11-1 has a form in which the plurality of conductive patterns 111-4, 111-5, 111-6, and 111-7 are connected to one another in parallel.

FIGS. 4 through 8, are views schematically illustrating examples of coils of a coil device. The views illustrate cases in which slits are formed in different portions of the coil, that is, cases in which the coil has a form in which conductive patterns are connected to one another in parallel only in an intermediate portion of the length of the coil.

Figure 4:
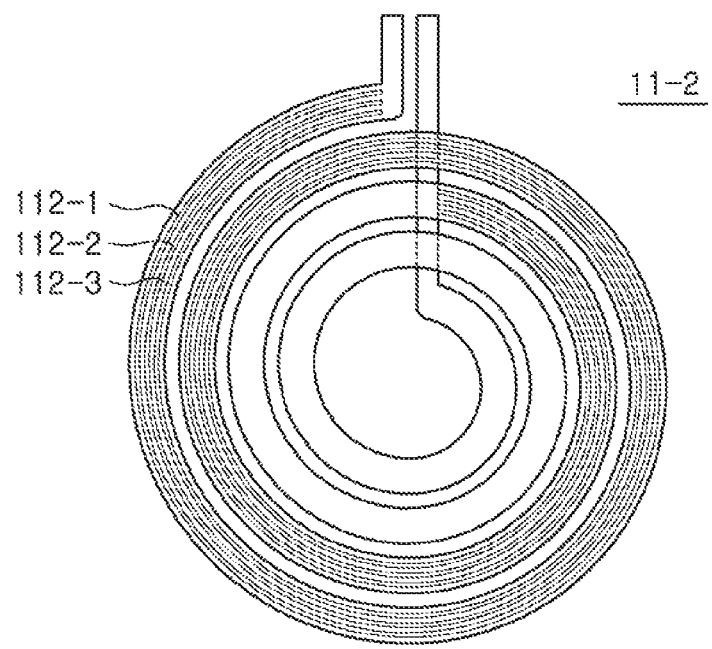
FIGS. 4 through 9 are views schematically illustrating examples of coils of a coil device.

As illustrated in FIG. 4, according to an example in the present disclosure, slits 112-1, 112-2, and 112-3 are formed only an outer side portion of a coil 11-2 of the coil device. That is, the coil 11-2 has a form in which the conductive patterns are connected to one another in parallel only in the outer side portion thereof.

Figure 5:
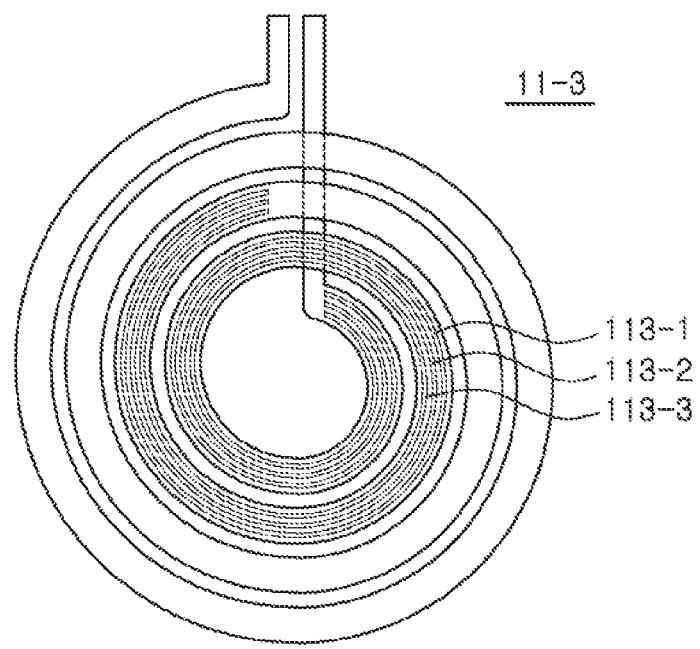

As illustrated in FIG. 5, according to an example in the present disclosure, slits 113-1, 113-2, and 113-3 are formed only in coil pattern formed in an inner side portion of a coil 11-3 of the coil device. That is, the coil 11-3 has a form in which the conductive patterns are connected to one another in parallel in only the inner side portion thereof.

Figure 6:
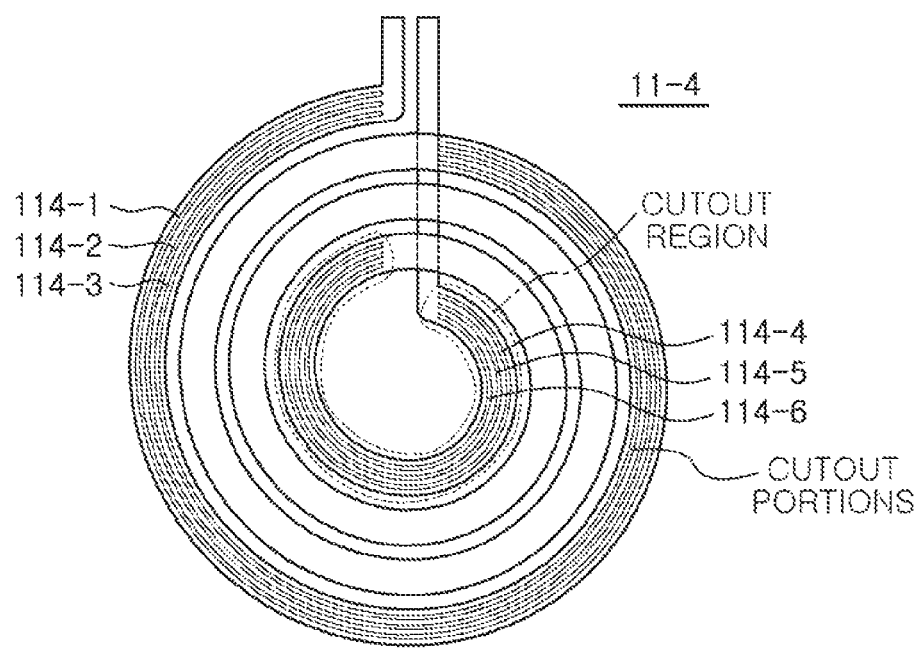

As illustrated in FIG. 6, according to an example in the present disclosure, slits 114-1, 114-2, 114-3, 114-4, 114-5, and 114-6 are formed only in coil pattern formed in the outermost portion and the innermost portion of a coil 11-4 of the coil device, except for a central portion of the coil 11-4. That is, the coil 11-4 has a form in which the conductive patterns are connected to one another in parallel in only the outermost portion and the innermost portion thereof, excluding a central portion thereof. The slits 114-1, 114-2, 114-3, 114-4, 114-5 formed in the coil are defined by cutout portions extending along the length of coil 11-4 (coil strand) in an intermediate portion thereof to divide the intermediate portion of the coil 11-4 into multiple strands.

Figure 7:
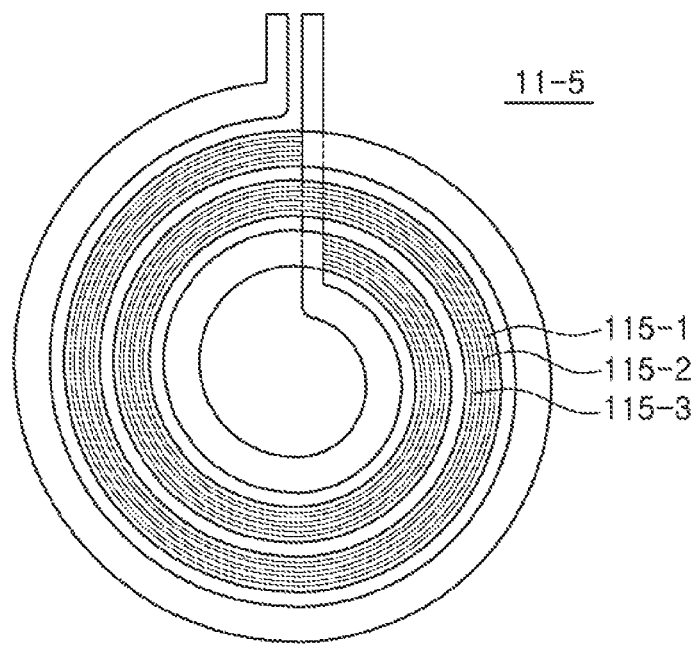

As illustrated in FIG. 7, according to an example in the present disclosure, slits 115-1, 115-2, and 115-3 are formed only in coil pattern formed in a central portion of a coil 11-5 of the coil device. The central portion being defined between the outermost and innermost portions of the coil device. That is, the coil 11-5 has a form in which the conductive patterns are connected to one another in parallel in only the central portion thereof. The slits 115-1, 115-2, and 115-3 formed in the coil are defined by cutout portions extending along the length of coil (coil strand) in an intermediate portion thereof to divide the intermediate portion of the coil into multiple strands.

The coil patterns of the coil of the coil device are formed as illustrated in FIGS. 4 through 7, whereby a coil having a smaller size (or diameter) may be formed.

Figure 8:
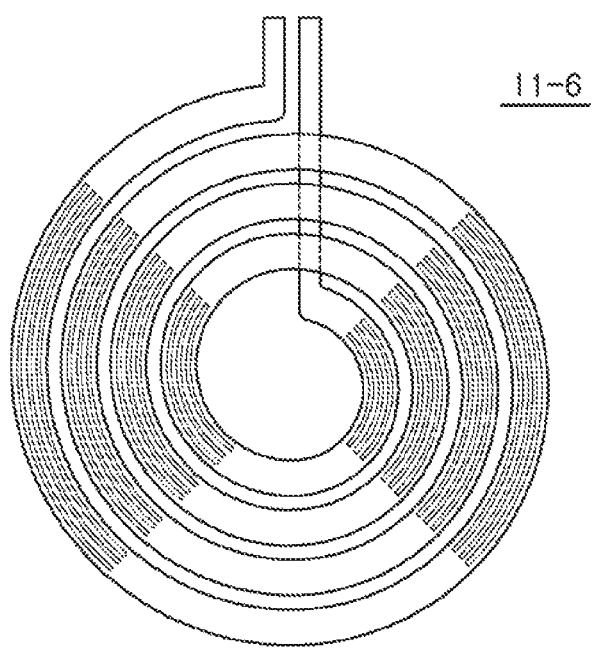

In addition, as illustrated in FIG. 8, according to another example in the present disclosure, slits are formed only in the coil pattern formed in some regions of a coil 11-6 of the coil device. That is, the coil 11-6 has a form in which the conductive patterns are connected to one another in parallel in and the slits define a pie-shaped contour.

FIGS. 4 through 8 illustrate cases in which the coil has a circular shape but the coil may have various shapes, e.g., the coil may have an oval shape. In this case, slits may be formed in regions in a length-wise direction, as illustrated in FIG. 8.

Figure 9:
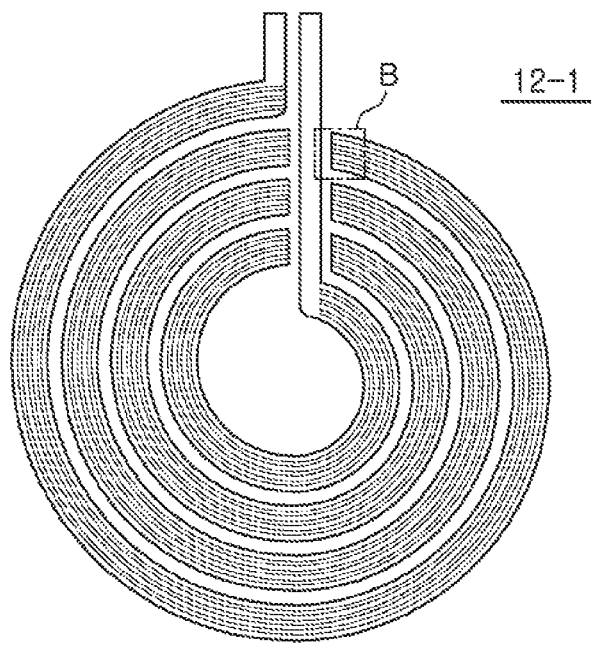

FIG. 9 is a view schematically illustrating a coil of a coil device according to another example in the present disclosure. As described above, the coil device may be the printed circuit board having the coil patterns formed on both surfaces thereof.

FIG. 9 illustrates a coil pattern formed on the other surface of the printed circuit board illustrated in FIG. 2, which is formed on one surface of the printed circuit board. The coil 12-1, illustrated in FIG. 9, is connected to the coil 11-1 illustrated in FIG. 2 through vias. In addition, slits may be substantially formed over an entire region of coil pattern of the coil 12-1. That is, the coil 12-1 has the form in which a plurality of conductive patterns are connected to one another in parallel in the entire region thereof.

Although not illustrated, coil devices may also be formed as illustrated in FIGS. 2 and 9 in cases in which the coil pattern, as illustrated in FIGS. 4 through 8, are formed on one surface of the printed circuit board. In each case, slits may be formed only in portions of coil pattern formed on the other surface of the printed circuit board that correspond to portions in which the slits are formed in the coil pattern formed on one surface of the printed circuit board.

Figure 10:
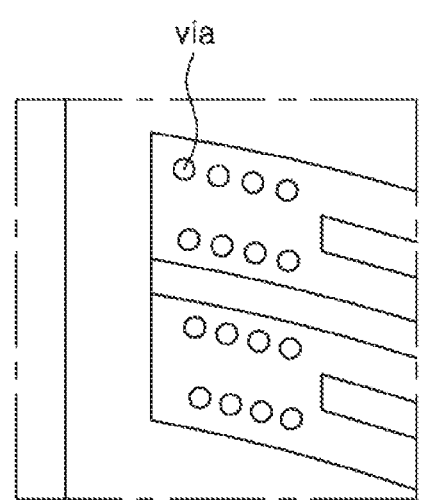
FIG. 10 is a view illustrating a cut-away portion B of FIG. 9 in more detail.

FIG. 10 is a view illustrating a cut-away portion B of FIG. 9 in more detail.

As illustrated in FIG. 10, slits are formed in coil pattern of the coil 12-1 of the coil device according to another example, such that the coil 12-1 has a form in which a plurality of conductive patterns are connected to one another in parallel.

As described above, the vias are formed in order to connect the coil 12-1, illustrated in FIG. 9, and the coil 11-1, illustrated in FIG. 2, to each other. As illustrated in FIG. 10, the slits are not formed in regions in which the vias are formed. In other words, the number of conductive patterns of the coil in the region in which the vias are formed are less than the number of conductive patterns (or strands) of the coil in a region in which the vias are not formed. Through the configuration as described above, the vias are more easily formed, and the connection between the coils are further improved through the vias. However, in cases in which space is not an issue, slits may also be formed in the region in which the vias are formed.

FIGS. 11 through 16, which are views schematically illustrating respective coils of a coil device according to examples in the present disclosure, illustrate cases in which the coil device is implemented by forming coils on both surfaces of a board.

Figure 11:
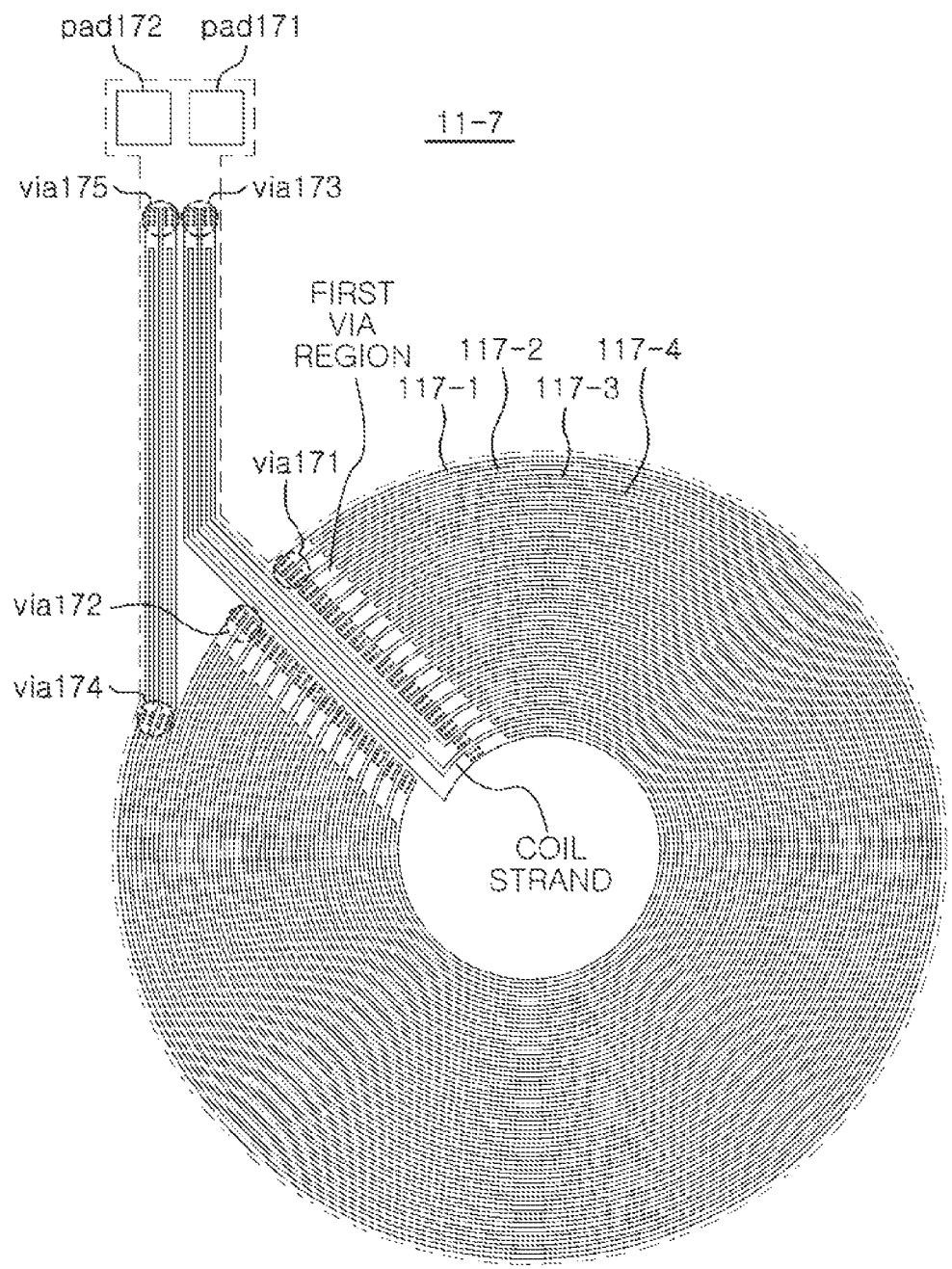
FIGS. 11 through 16 are views schematically illustrating examples of coils of a coil device.
Figure 12:
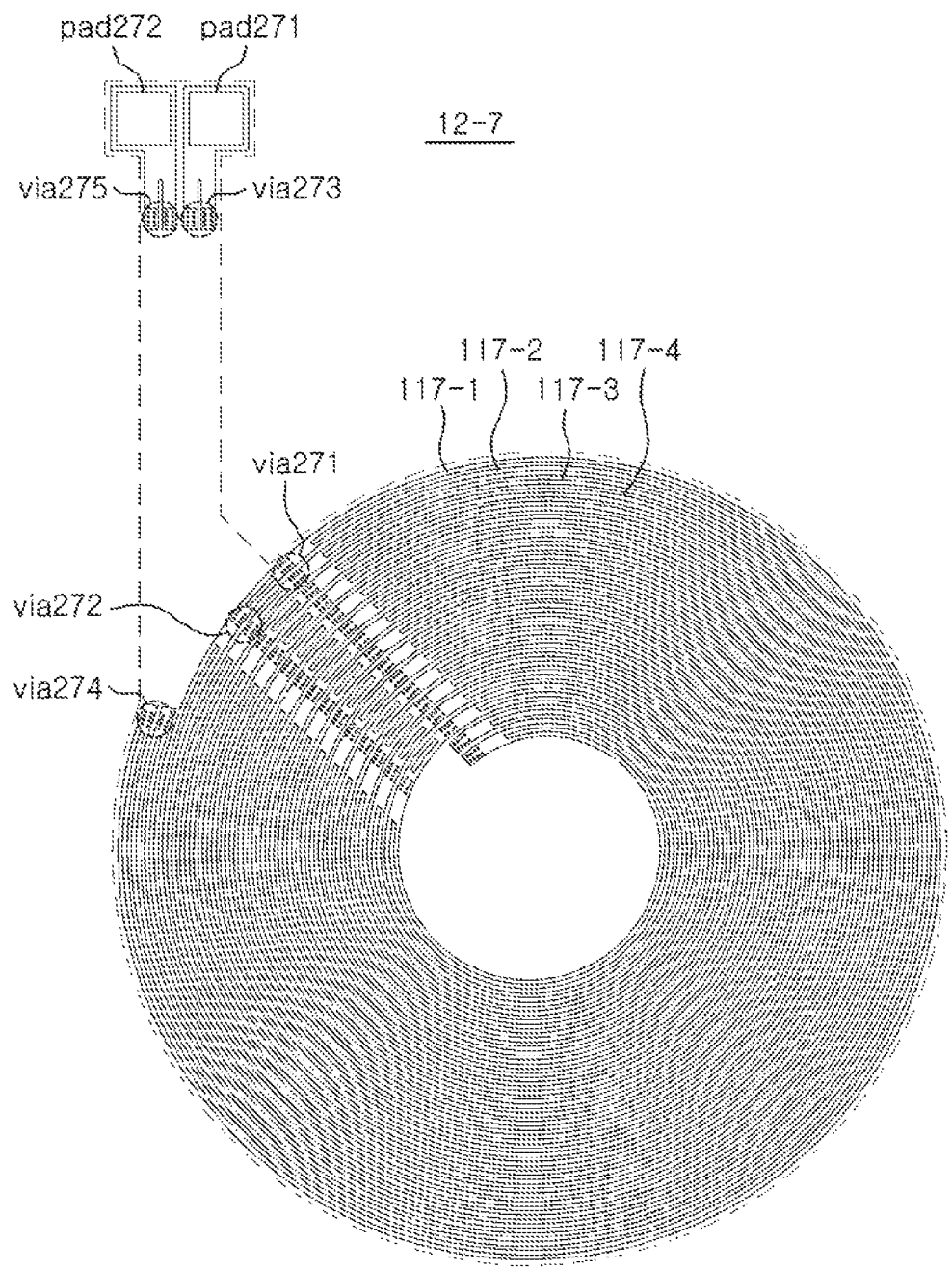

FIG. 11 schematically illustrates a form of a first coil formed on one surface of a board when viewed from a side of the coil device, and FIG. 12 schematically illustrates a form of a second coil formed on the other surface of the board when viewed from the other side of the coil device.

As illustrated in FIG. 11, the number of conductive patterns are fewer in portions in which vias (via171, via172, via173, via174, and via175) of a first coil 11-7 are disposed than in other portions. In detail, the remaining portions, except for the portions in which the vias (via171, via172, via173, via174, and via175) of the first coil 11-7 are disposed, are implemented by four conductive patterns (117-1, 117-2, 117-3, and 117-4) and the portions in which the vias (via171, via172, via173, via174, and via175) of the first coil 11-7 are disposed, are implemented by two conductive patterns. The four conductive patterns (117-1, 117-2, 117-3, and 117-4) are connected to one another in parallel.

As illustrated in FIG. 12, the number of conductive patterns are fewer in portions in which vias (via271, via272, via273, via274, and via275) of a second coil 12-7 are disposed, than in other portions. In detail, the second coil 12-7 is implemented using four conductive patterns, 127-1, 127-2, 127-3, and 127-4 except for the portions in which the vias (via271, via272, via273, via274, and via275) are disposed, which are implemented using two conductive patterns. The four conductive patterns, 127-1, 127-2, 127-3, and 127-4, are connected to one another in parallel.

Each of the vias (via171, via172, via173, via174, and via175) and vias (via271, via272, via273, via274, and via275) may be configured similarly. That is, portions in which each of the vias (via171, via172, via173, via174, and via175) of the first coil 11-7 is formed, and portions in which each of the vias (via271, via272, via273, via274, and via275) of the second coil 12-7 is formed, may be connected to each other through the vias.

In addition, each of pads (pad171 and pad172) of FIG. 11 and pads (pad271 and pad272) of FIG. 12 may be connected to each other. To this end, additional vias may be formed. Therefore, the pads (pad171 (see FIG. 11) and pad271 (see FIG. 12)), may be connected to distal ends of inner sides of the first coil 11-7 (see FIG. 11) and the second coil 12-7 (see FIG. 12), respectively. The pads (pad172 (see FIG. 11) and pad272 (see FIG. 12)) may be connected to distal ends of outer sides of the first coil 11-7 (see FIG. 11) and the second coil 12-7 (see FIG. 12), respectively. The pads (pad171 and pad172 (see FIG. 11) and pad271 and pad272 (see FIG. 12)) may be electrically connected to an external device. The external device may include a device or a circuit for rectifying power received by the coil device, and may include a device or a circuit for modulating or demodulating data that are to be transmitted and received through the coil device.

Cases in which a plurality of connection patterns for connecting the distal end of the inner side of the first coil 11-7 and a first pad (pad171) to each other, and a plurality of connection patterns for connecting the distal end of the outer side of the first coil 11-7 and a second pad (pad172) to each other have a form in which they are connected to one another in parallel, respectively (as illustrated in FIG. 11 where some or all of the connection patterns may also be formed as one pattern).

As illustrated in FIG. 11, the first coil 11-7 includes disconnected patterns formed in portions in which the connection patterns for connecting the distal end of the inner side of the first coil 11-7 and the pad (pad171) to each other are formed. The disconnected portions of the first coil 11-7 are electrically connected to the vias (via171 and via172 (see FIG. 11) or to vias via271 and via272 (see FIG. 12)) through portions of the second coil 12-7. That is, the first coil 11-7 partially shares the second coil 12-7 in the portions in which the connection patterns for connecting the distal end of the inner side of the first coil 11-7 and the pad (pad171) to each other are formed. In other words, the first coil 11-7 has a bypass path passing through a portion of the second coil 12-7 in the portions in which the connection patterns for connecting the distal end of the inner side of the first coil 11-7 and the pad, (pad171) to each other are formed.

Figure 13:
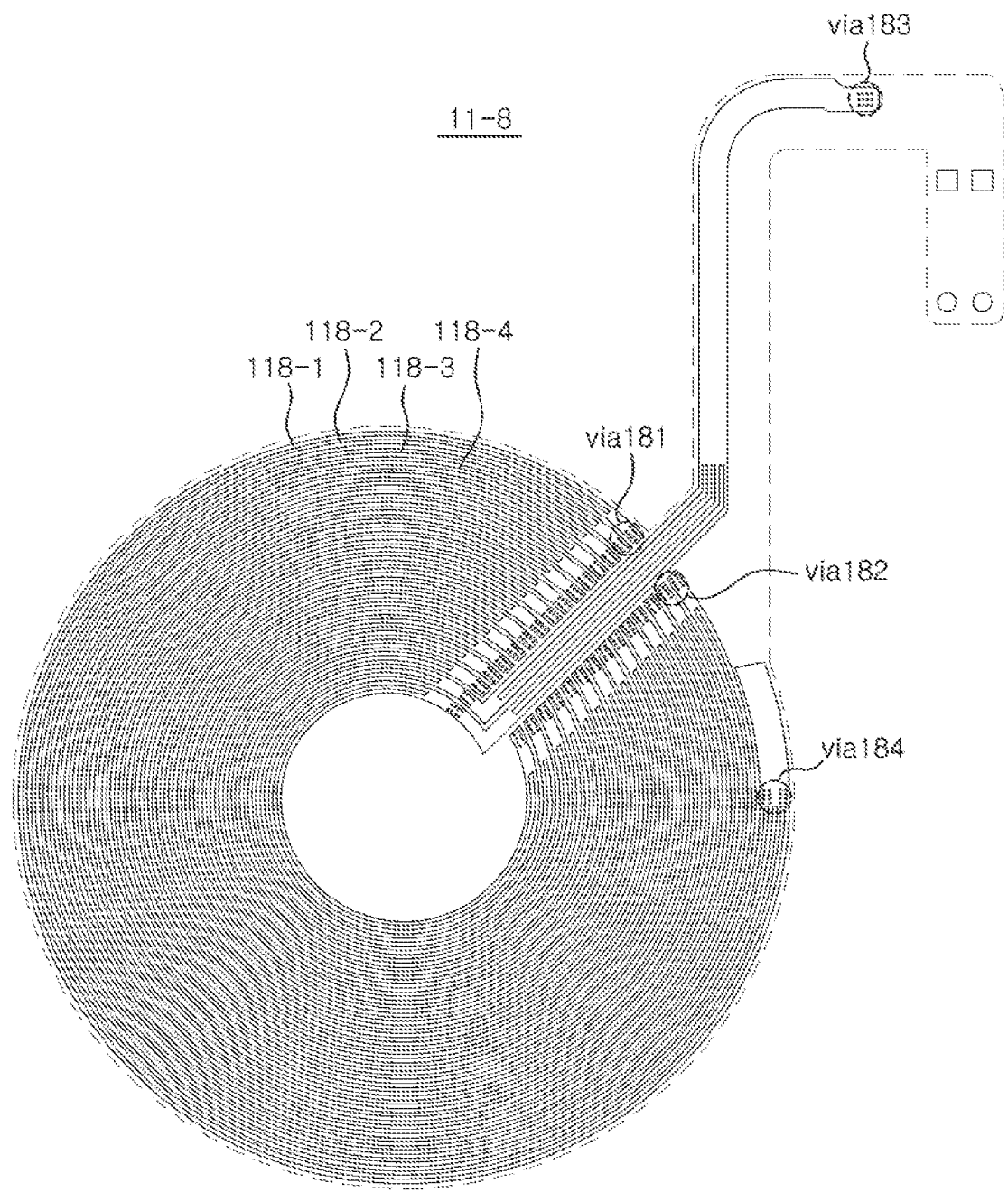
Figure 14:
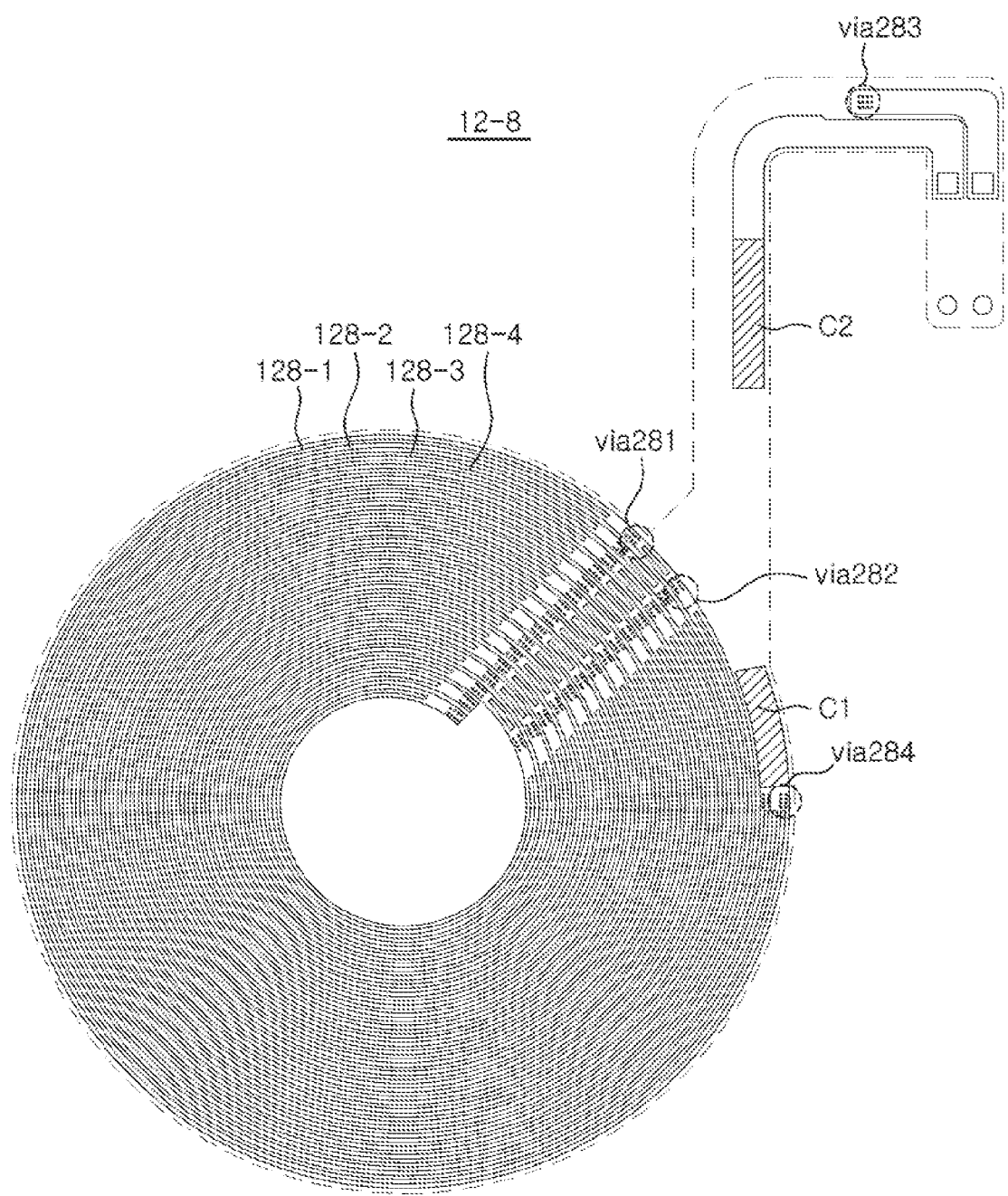

FIG. 13 schematically illustrates a form of a first coil formed on one surface of a board when viewed from one side of the coil device, and FIG. 14 schematically illustrates a form of a second coil formed on the other surface of the board when viewed from the other side of the coil device.

As illustrated in FIG. 13, the number of conductive patterns are fewer in portions in which vias (via181, via182, via183, and via184) of a first coil 11-8 are disposed than in other portions. In detail, the first coil 11-8 is implemented using four conductive patterns (118-1, 118-2, 118-3, and 118-4) except for the portions in which the vias (via181, via182, via183, and via184) of the first coil 11-8 are disposed. The portions in which the vias (via181 and via182) of the first coil 11-8 are disposed is implemented using two conductive patterns, and the portions in which the vias (via183 and via184) of the first coil 11-8 are disposed is implemented using one conductive pattern. The four conductive patterns (118-1, 118-2, 118-3, and 118-4) are connected to one another in parallel.

As illustrated in FIG. 14, the number of conductive patterns is fewer in portions in which vias (via281, via282, via283, and via284) of a second coil 12-8 are disposed than in other portions. In detail, the remaining portions, except for the portions in which the vias (via281, via282, via283, and via284) of the second coil 12-8 are disposed are implemented using four conductive patterns (128-1, 128-2, 128-3, and 128-4). The portions in which the vias (via281 and via282) of the second coil 12-8 are disposed is implemented using two conductive patterns, and the portions in which the vias (via283 and via284) of the second coil 12-8 are disposed are implemented using one conductive pattern. The four conductive patterns (128-1, 128-2, 128-3, and 128-4) are connected to one another in parallel.

Each of the vias (via181, via182, via183, and via184) and the vias (via281, via282, via283, and via284) may be configured similarly. That is, portions in which each of the vias (via181, via182, via183, and via184) of the first coil 11-8 are formed and portions in which each of the vias (via281, via282, via283, and via284) of the second coil 12-8 are formed are connected to each other through the vias.

As described above, the coil device is included in an apparatus including a cover formed of metal. In this case, connection parts (C1 and C2) of the second coil 12-8 (see FIG. 14) are electrically connected to the cover formed of metal. In addition, the entirety of or a portion of the second coil 12-8 (see FIG. 14) is implemented using a portion of the cover. That is, the entirety of or a portion of the second coil 12-8 (see FIG. 14) may also serve as the cover.

As illustrated in FIG. 13, the first coil 11-8 includes disconnected patterns formed in portions in which the connection patterns for connecting a distal end of an inner side of the first coil 11-8 and an external pad to each other are formed. The disconnected portions of the first coil 11-8 are electrically connected to the vias (via181 and via182 (see FIG. 13) or via281 and via282 (see FIG. 14)) through portions of the second coil 12-8, respectively. That is, the portions of the first coil 11-8 and the second coil 12-8, in which the connection patterns for connecting the distal end of the inner side of the first coil 11-8 and the pad to each other are formed, are provided in common. In other words, the first coil 11-8 has a bypass path passing through a portion of the second coil 12-8 in the portions in which the connection patterns for connecting the distal end of the inner side of the first coil 11-8 and the pad to each other are formed.

Figure 15:
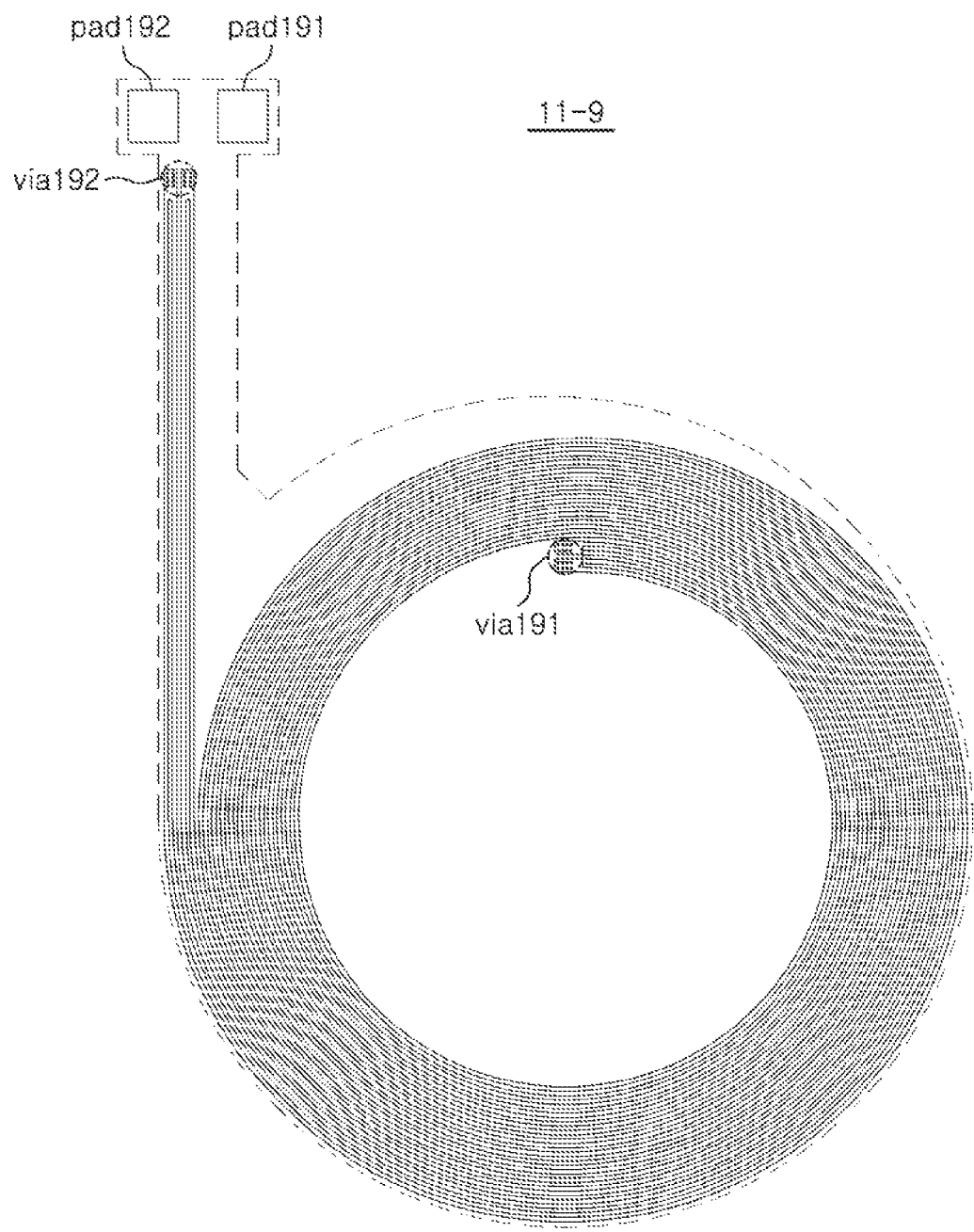
Figure 16:
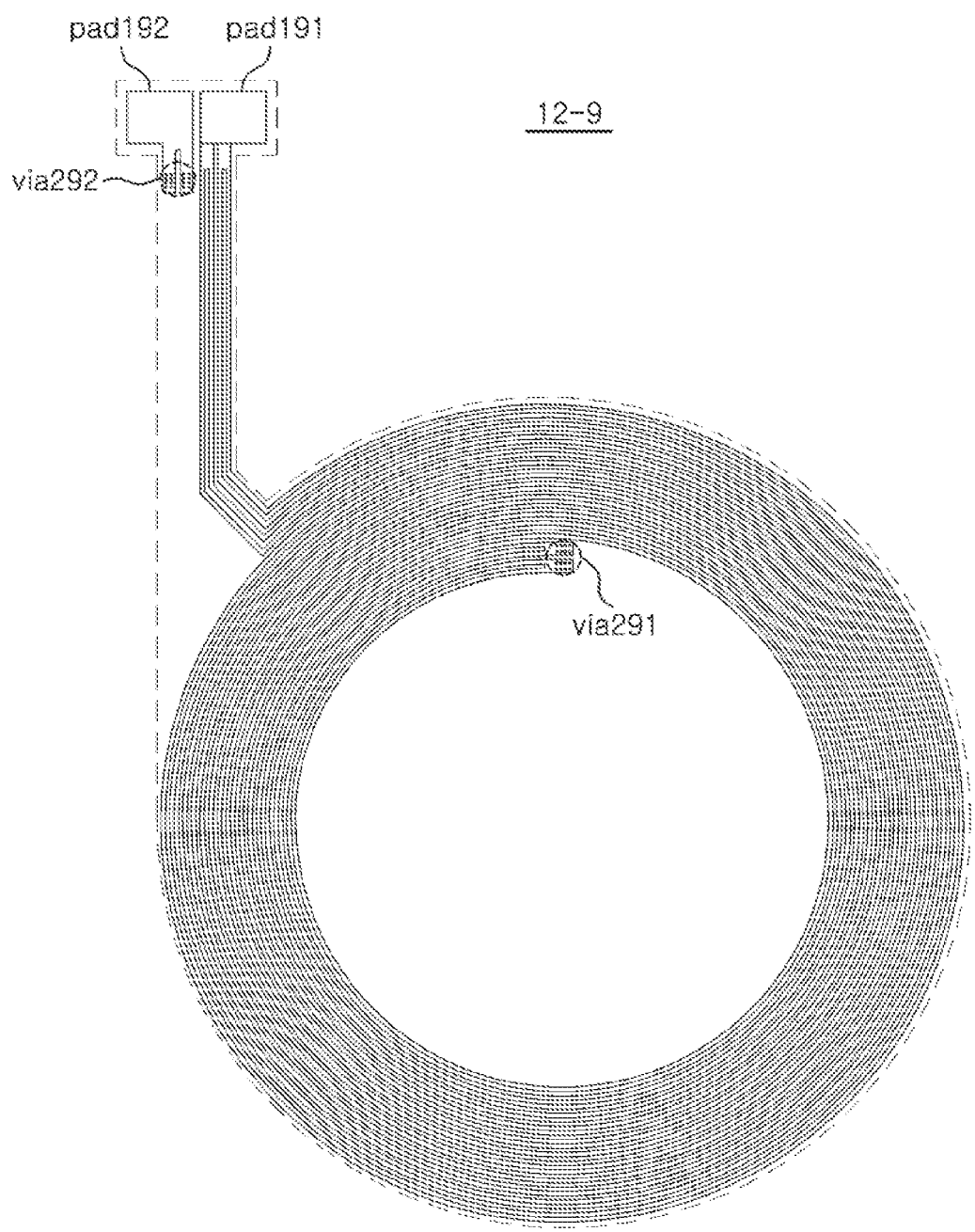

FIG. 15 schematically illustrates a form of a first coil formed on one surface of a board when viewed from one side of the coil device, and FIG. 16 schematically illustrates a form of a second coil formed on the other surface of the board when viewed from the other side of the coil device.

As illustrated in FIG. 15, the number of conductive patterns are fewer in portions in which vias (via191 and via192) of a first coil 11-9 are disposed than in other portions. In detail, the remaining portions, except for the portions in which the vias (via191 and via192) of the first coil 11-9 are disposed are implemented using four conductive patterns. The portions in which the vias (via191 and via192) of the first coil 11-9 are disposed may be implemented by two conductive patterns. The four conductive patterns are connected to one another in parallel.

As illustrated in FIG. 16, the number of conductive patterns are fewer in a portion in which vias (via291 and via292) of a second coil 12-9 is disposed than in other portions. In detail, the remaining portions, except for the portion in which the vias (via291 and via292) of the second coil 12-9 is disposed are implemented using four conductive patterns, and the portion in which the vias (via291 and via292) of the second coil 12-9 are disposed is implemented using two conductive patterns. The four conductive patterns may be connected to one another in parallel.

Each of the vias (via191 and via192, and the vias, via291 and via292) may be similarly configured. That is, a portion in which the via (via191) of the first coil 11-9 is formed and a portion in which the via (via291) of the second coil 12-9 is formed are connected to each other through the via. A distal end of an inner side of the first coil 11-9 and a distal end of an inner side of the second coil 12-9 are electrically connected to each other through the vias (via191 (see FIG. 15) or via291 (see FIG. 16)).

In addition, each of pads (pad191 and pad192) of FIG. 15 and each of pads (pad291 and pad292) of FIG. 16 may be connected to each other. To this end, additional vias may be formed.

A distal end of an outer side of the first coil 11-9 is connected to the pads (pad192 (see FIG. 15) and pad292 (see FIG. 16)) through the via (via192 (see FIG. 15) or via292 (see FIG. 16)). A distal end of an outer side of the second coil 12-9 is connected to the pads (pad191 (see FIG. 15) and pad291 (see FIG. 16)).

The coils of the coil device are formed as illustrated in FIGS. 15 and 16, such that the number of spirals in the coil is reduced, which reduces the size and space needed for the coils.

Although a case in which the coil device includes one coil has been illustrated in FIGS. 2 through 16, the coil device according to examples in the present disclosure may include a plurality of coils performing different functions. For example, the coil device may include one or more coils for receiving wireless power and one or more coils for performing wireless communications. In a case in which the number of coils is more than one, the respective coils may be operated in different schemes. For example, the coil device may also include a plurality of coils, each receiving power transmitted, depending on different standards. Alternatively, the coil device may also include a communications coil for near field communications, a communications coil for electronic payment, and the like.

Figure 17:
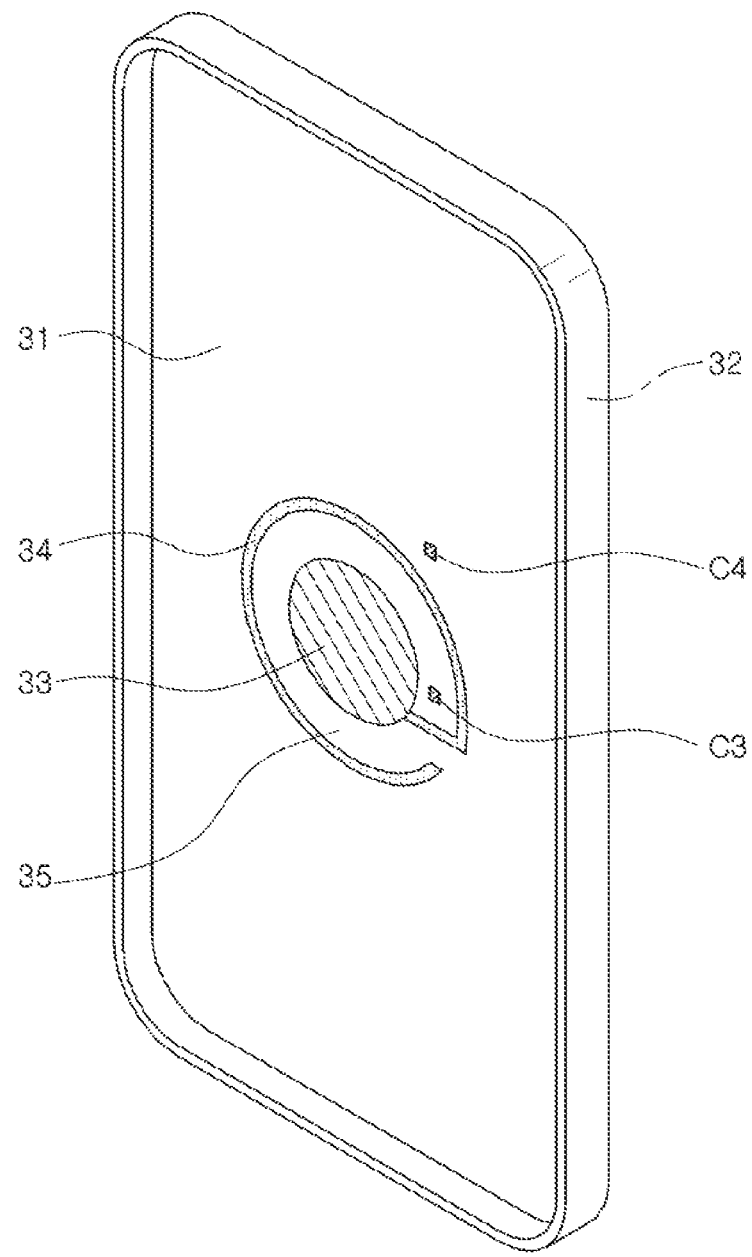
FIG. 17 is a perspective view illustrating an example of a cover of an apparatus.

FIG. 17 is a perspective view illustrating an example of a cover 30-1 for an apparatus.

Referring to FIG. 17, the cover 30-1 includes a plate 31. The plate 31 may be formed of a conductive material such as an aluminum alloy, a magnesium alloy, a copper alloy, or the like. Therefore, the cover 30-1, which is a metal case of the apparatus, may be coupled to the body of the apparatus. In addition, the cover 30-1 may be separated from the body of the apparatus or may be implemented integrally with the body of the apparatus.

A protecting layer 32 is formed on a surface of the plate 31. The protecting layer 32 may be formed by anodizing one surface of the plate 31. Alternatively, the protecting layer 32 may be formed of an insulating film such as polyethylene terephthalate (PET), polycarbonate (PC), polyethersulfone (PES), polyimide (PI), polymethylmethacrylate (PMMA), cyclo-olefin polymers (COP), or the like; however, the material of the protecting layer is not limited thereto.

The cover 30-1 includes a slit part 34 and an inductance part 35. In addition, the cover 30-1 includes a central region 33. The inductance part 35 is connected to the coil device, according to an example, to form a portion of the coil.

The coil device according to an example is disposed in the cover 30-1, and the central region 33 is disposed in a region corresponding to a central portion of the coil of the coil device. The central region 33, which is an opening, may have various shapes, such as a circular shape, a polygonal shape including a quadrangular shape, and the like, and the inductance part 35 may be adjacent to an outer circumference of the central region 33. In addition, the central region 33 may expose an inner side of the cover through the opening, and may be filled with a non-metal, to block the inner side of the cover from an outer side of the cover.

In order to maintain wireless transmission efficiency, loss of the magnetic flux passing through the central region 33 needs to be significantly reduced. That is, interference of the central region 33 due to magnetic coupling between a coil for transmitting wireless power and a coil for receiving wireless power needs to be significantly reduced.

To this end, the central region 33 may expose the inner side of the cover through the opening formed by cutting the plate 31, and may be filled with the non-metal, to physically block the inner side of the cover from the outer side of the cover.

Alternatively, the central region 33 may include a plurality of metal tiles supported by an insulating member. That is, the plurality of metal tiles may be disposed in the central region 33, and a clearance between the metal tiles may be filled with the insulating member. The plurality of metal tiles may be arranged in a lattice shape or in a radial shape.

The slit part 34 forms the boundary between the plate 31 and the inductance part 35. That is, the slit part 34 is formed by cutting one region of the plate 31, and the inductance part 35 separated from the plate 31 by the slit part 34 may be formed. In addition, the slit part 34 is connected from the central region 33.

Meanwhile, the central region 33 and the slit part 34 may be formed using a machine press method such as a punching mold, but its formation method is not limited thereto.

The inductance part 35 is disposed in one region of the cover, and has a region separated from the plate 31 by the slit part 34. In addition, in a case in which the cover 30-1 includes the central region 33, the inductance part 35 surrounds the central region 33, and is adjacent to the outer circumference of the central region 33.

Further, the inductance part 35 may be disposed in a region corresponding to an inductor disposed at the inner side of the cover, and may have one end connected to the plate 31.

The inductance part 35 may be formed of the same material as that of the plate 31. However, the material of the inductance part 35 may be changed in a case in which a surface of the inductance part 35 is covered with a conductive member, in order to increase wireless transmission efficiency or to facilitate the use of other working methods.

In addition, the inductance part 35 may include at least one connection part for electrically connecting to one end of the coil. For example, in a case in which the cover 30-1, illustrated in FIG. 17, is coupled to the coil device illustrated in FIGS. 13 and 14, the inductance part 35 may include two connection parts C3 and C4, as illustrated in FIG. 17. The connection part C3 may be connected to the connection part C1 (see FIG. 14), and the connection part C4 may be connected to the connection part C2 (see FIG. 14).

The connection parts of the cover are connected to the connection parts of the coil device, whereby the inductance part of the cover may serve as a portion of the coil. For example, as described above, when each of the connection parts C3 and C4 of the cover 30-1 illustrated in FIG. 17 and each of the connection parts C1 and C2 of the coil device illustrated in FIGS. 13 and 14 are connected to each other, one turn of the outermost side of the coil may be implemented by the inductance part 35, which is a portion of the cover 30-1. Therefore, even though the cover 30-1 is formed of the metal, losses, or the like, due to an eddy current is reduced, such that sufficient wireless power transmission efficiency is retained.

The cover illustrated in FIG. 17 may be coupled to coil devices according to various examples in the present disclosure. To this end, the shape of the inductance part or positions of the connection parts may each be modified. In addition, although a case in which the number of connection parts is two has been illustrated in FIG. 17, the number of connection parts may also be one. In a case in which the number of connection parts is one, the cover 30-1 may also serve as a ground electrode.

Meanwhile, the insulating member may be provided in the slit part 34 and the central region 33. The insulating member may be an electrical insulating material such as silicon, or the like. That is, the insulating member may be filled in a space formed by the slit part 34 and the central region 33, such that intrusion of foreign materials into the cover 30-1 is prevented.

In addition, the insulating member may have the same color as that of the plate 31. In this case, the slit part 34 and the central region 33 may not be different from the plate 31 in terms of an appearance.

Figure 18:
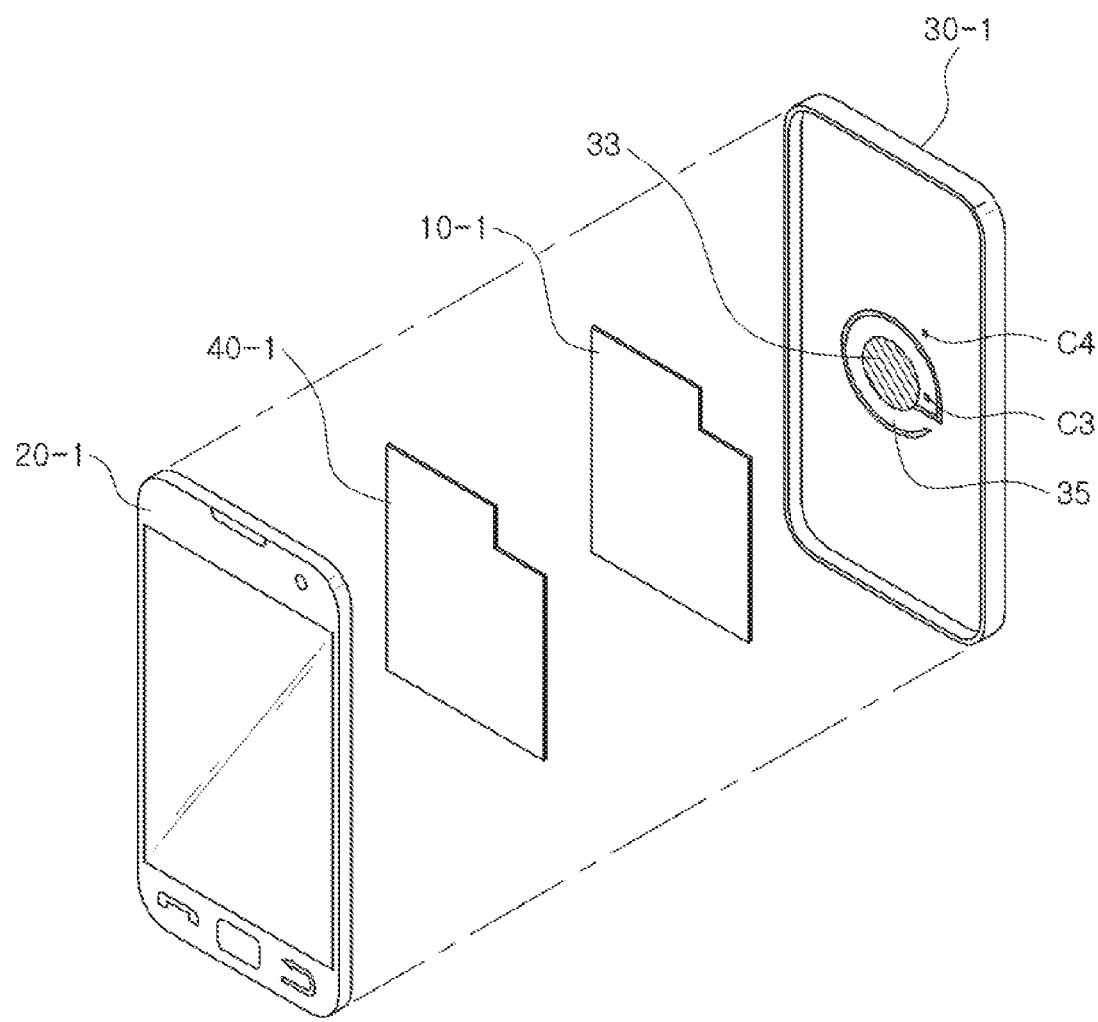
FIG. 18 is an exploded perspective view schematically illustrating an example of an apparatus in the present disclosure.

FIG. 18 is an exploded perspective view schematically illustrating the apparatus according to an example in the present disclosure. Although a portable terminal has been illustrated as an example of the apparatus in FIG. 18, the apparatus is not limited to the portable terminal. For example, a portable electronic apparatus such as a tablet personal computer, a laptop computer, a wearable device, etc., together with an electronic apparatus forming a wireless transmission system or the like, may be an example in the present disclosure.

Referring to FIG. 18, the apparatus according to an example includes a coil device 10-1, a body 20-1, and a cover 30-1.

In addition, the apparatus may further include a shielding sheet 40-1.

The coil device 10-1, which is a thin film board having a coil formed thereon, may be a flexible board such as a flexible printed circuit board (FPCB). The coil device 10-1 may include various types of coils, illustrated in FIGS. 2 to 16.

The shielding sheet 40-1 is disposed at one side of the coil device 10-1. The shielding sheet 40-1 may be provided in order to efficiently form a magnetic path of an electromagnetic field formed by a charging apparatus in order to wirelessly transmit power.

To this end, the shielding sheet 40-1 is formed in a flat plate shape (or a sheet shape), and may be a magnetic sheet, such as a ferrite sheet or a metal sheet, such as an aluminum sheet. However, the shielding sheet 40-1 is not limited thereto.

In addition, the shielding sheet 40-1 may also be formed by applying ferrite powders or conductive powders onto one surface of a coil board 200.

The cover 30-1, which is the metal case of the portable terminal as described above with reference to FIG. 17, may be coupled to the body 20-1 in a detachable form or may be formed integrally with the body 20-1. The cover 30-1 may be the same as the cover described above with reference to FIG. 17.

Although the cover that may be coupled to the coil device illustrated in FIGS. 13 and 14 has been illustrated in FIGS. 17 and 18, a coil device according to another example may be coupled to the cover formed of the metal by a method similar to the method described above.

As set forth above, in the coil device and the apparatus including the same according to an exemplary embodiment in the present disclosure, an eddy current or the like is reduced, to reduce loss, whereby efficiency of a communications signal or of wireless power may be increased in a case of transmitting or receiving the communications signal or the wireless power.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil device, comprising:
   a board;
   a first pattern on one surface of the board, the first pattern including one or more cutouts and a plurality of first wires separated by the cutouts, the plurality of first wires extending in parallel with each other;
   a second pattern on the other surface of the board; and
   at least one pattern via electrically connecting the first pattern and the second pattern to each other,
   wherein a via region, corresponding to a first region in which the pattern via is disposed in the first pattern, includes n first conducting wires (where n is a natural number of 1 or more), and at least a portion of the first pattern, excluding the via region in the first pattern, includes m first conducting wires (where m is greater than n and is a natural number of 2 or more).

2. The coil device of claim 1, further comprising:
   a plurality of pads; and
   a first connection pattern electrically connecting a first distal end of a first inner side of the first pattern and one of the plurality of pads to each other,
   wherein the at least one pattern via comprises pattern vias, and
   wherein in a second region in which the first connection pattern is disposed, spiral paths of the first pattern are discontinued to terminate in the pattern vias at positions adjacent to the first connection pattern.

3. The coil device of claim 2, wherein a second distal end of a second inner side of the second pattern is electrically connected to the first distal end of the first inner side of the first pattern through one of the pattern vias, and a third distal end of a first outer side of the first pattern is electrically connected to a fourth distal end of a second outer side of the second pattern through another one of the pattern vias.

4. The coil device of claim 3, wherein the plurality of pads comprises:
   first and second pads on one surface of the board;
   a third pad on the other surface of the board and electrically connected to the first pad;
   a fourth pad on the other surface of the board and electrically connected to the second pad; and
   one end of the first connection pattern being connected to the first distal end of the first inner side of the first pattern, and the other end of the first connection pattern is electrically connected to the third pad through a first pad via.

5. The coil device of claim 4, further comprising:
   a second connection pattern on one surface of the board and having one end connected to the third distal end of the first outer side of the first pattern and the other end electrically connected to the fourth pad through a second pad via.

6. The coil device of claim 4, further comprising:
   a second connection pattern on the other surface of the board in order to electrically connect the fourth distal end of the second outer side of the second pattern and the fourth pad to each other.

7. The coil device of claim 6, wherein
one of the second connection pattern is connected to the fourth pad,
a first connection part connected to a cover including metal is at the other end of the second connection pattern, and
a second connection part connected to the cover is at the fourth distal end of the second outer side of the second pattern.

8. The coil device of claim 1, wherein the at least one pattern via is disposed in a second region adjacent to a first distal end of a first inner side of the first pattern, and the first distal end of the first inner side of the first pattern and a second distal end of a second inner side of the second pattern are electrically connected to each other through the pattern via.

9. The coil device of claim 8, further comprising:
first and second pads on one surface of the board;
a third pad on the other surface of the board and electrically connected to the first pad;
a fourth pad on the other surface of the board and electrically connected to the second pad;
a first connection pattern on one surface of the board and having one end connected to a third distal end of a first outer side of the first pattern and the other end electrically connected to the third pad through a first pad via; and
a second connection pattern on the other surface of the board and having one end connected to a fourth distal end of a second outer side of the second pattern and the other end connected to the fourth pad.

10. An apparatus comprising:
a cover; and
a coil device including,
a board,
a first pattern on one surface of the board, the first pattern including one or more cutouts and a plurality of first wires separated by the cutouts, the plurality of first wires extending in parallel with each other,
a second pattern on another surface of the board, and
at least one pattern via electrically connecting the first pattern and the second pattern to each other,
wherein a via region, corresponding to a first region in which the pattern via is disposed in the first pattern includes n first conducting wires (n indicates a natural number of 1 or more, and
at least a portion of the first pattern, excluding the via region in the first pattern, includes m first conducting wires (where m is greater than n and is a natural number of 2 or more).

11. The apparatus of claim 10, wherein the coil device further comprises:
first and second pads on one surface of the board;
a third pad on the other surface of the board and electrically connected to the first pad;
a fourth pad on the other surface of the board and electrically connected to the second pad; and
a first connection pattern on one surface of the board and having one end connected to a first distal end of a first inner side of the first pattern and the other end electrically connected to the third pad through a first pad via,
wherein the at least one pattern via comprises pattern vias, and
wherein in a second region in which the first connection pattern is disposed, spiral paths of the first pattern are discontinued to terminate in the pattern vias at positions adjacent to the first connection pattern.

12. The apparatus of claim 11, wherein the coil device further comprises a second connection pattern on one surface of the board and having one end connected to a second distal end of a first outer side of the first pattern and the other end electrically connected to the fourth pad through a second pad via.

13. The apparatus of claim 11, wherein the cover comprises:
a central region in a conductive plate;
a slit part connected to the central region; and
an inductance part defined by the slit part so as to partially enclose the central region.

14. The apparatus of claim 13, wherein the coil device further comprises a second connection pattern on the other surface of the board and connected to the cover so as to have one end connected to the fourth pad and the other end electrically connected to one end of the inductance part,
wherein a third distal end of a second outer side of the second pattern is electrically connected to the other end of the inductance part.

15. The apparatus of claim 10, wherein the coil device further comprises:
first and second pads on one surface of the board;
a third pad on the other surface of the board and electrically connected to the first pad;
a fourth pad on the other surface of the board and electrically connected to the second pad;
a first connection pattern on one surface of the board and having one end connected to a first distal end of a first outer side of the first pattern and the other end electrically connected to the third pad through a third via; and
a second connection pattern on the other surface of the board and having one end connected to a second distal end of a second outer side of the second pattern and the other end connected to the fourth pad,
wherein the at least one pattern via is disposed in a second region adjacent to a third distal end of a first inner side of the first pattern, and the third distal end of the first inner side of the first pattern and a fourth distal end of a second inner side of the second pattern are electrically connected to each other through the pattern via.

16. A coil device, comprising:
a first pattern comprising first coil strands on one surface of a board, each of the first coil strands having first via regions and at least one first cutout region, the first cutout region including first cutout portions, each of the first cutout portions extending along a first length of a corresponding one of the first coil strands in a first intermediate portion thereof to divide the first intermediate portion of the first coil strand into plural first strands; and
a second pattern comprising at least a second coil strand on another surface of the board,
wherein vias in each of the first via regions electrical connect the first coil strands to the second coil strand.

17. The coil device of claim 16, wherein each of the first coil strands comprises more than one cutout region.

18. The coil device of claim 16, wherein the second coil strand has second via regions and second cutout portions, each of the second cutout portions extending along a second length of the second coil strand in a second intermediate portion thereof to divide the second intermediate portion of the second coil strand into plural second strands.

19. The coil device of claim 16, wherein adjacent ones of the plural first strands are connected to each other in parallel.

20. The coil device of claim 18, wherein adjacent ones of the plural second strands are connected to each other in parallel.

\* \* \* \* \*